United States Patent [19]

Deckler

[11] 4,067,394
[45] Jan. 10, 1978

[54] IMPLEMENT WITH AUTOMATIC SEQUENCING VALVE AND SYSTEM

[75] Inventor: Harry C. Deckler, South Bend, Ind.

[73] Assignee: White Farm Equipment Company, Cleveland, Ohio

[21] Appl. No.: 651,443

[22] Filed: Jan. 22, 1976

[51] Int. Cl.² .................. A01B 63/10; A01B 39/28
[52] U.S. Cl. .................................. 172/2; 91/413; 172/130
[58] Field of Search ............... 172/127, 128, 130, 2, 172/126, 129, 131, 132; 111/33; 171/6; 91/413, 420, 445

[56] References Cited

U.S. PATENT DOCUMENTS

| 3,670,823 | 6/1972 | Mathews et al. | 172/128 |
| 3,677,348 | 7/1972 | Boetto et al. | 172/130 X |
| 3,714,991 | 2/1973 | Rieser | 172/130 |

FOREIGN PATENT DOCUMENTS 2,216,014  11/1973  Germany ................ 172/130

Primary Examiner—Richard T. Stouffer
Attorney, Agent, or Firm—Lockwood, Dewey, Zickert & Alex

[57] ABSTRACT

An implement such as a tractor-propelled, multi-row planter having row markers hingedly mounted on opposite sides is provided with an automatically operating hydraulic sequencing valve for alternately actuating the markers. The sequencing valve is adapted to be readily connected with the hydraulic system of the tractor used to raise and lower the implement. If desired the hydraulic circuit may be arranged so that the sequencing valve is automatically actuated or sequenced when the implement is raised and lowered whereby the oppositely mounted markers are alternately raised and lowered automatically with the raising and lowering of the implement itself.

5 Claims, 8 Drawing Figures

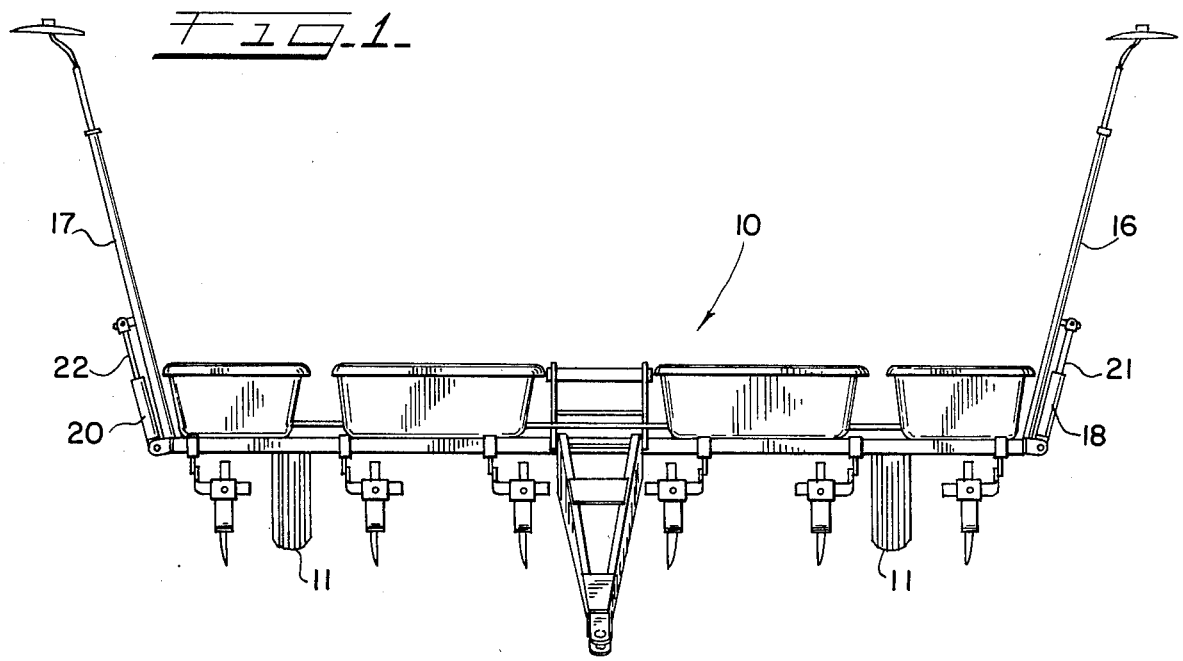
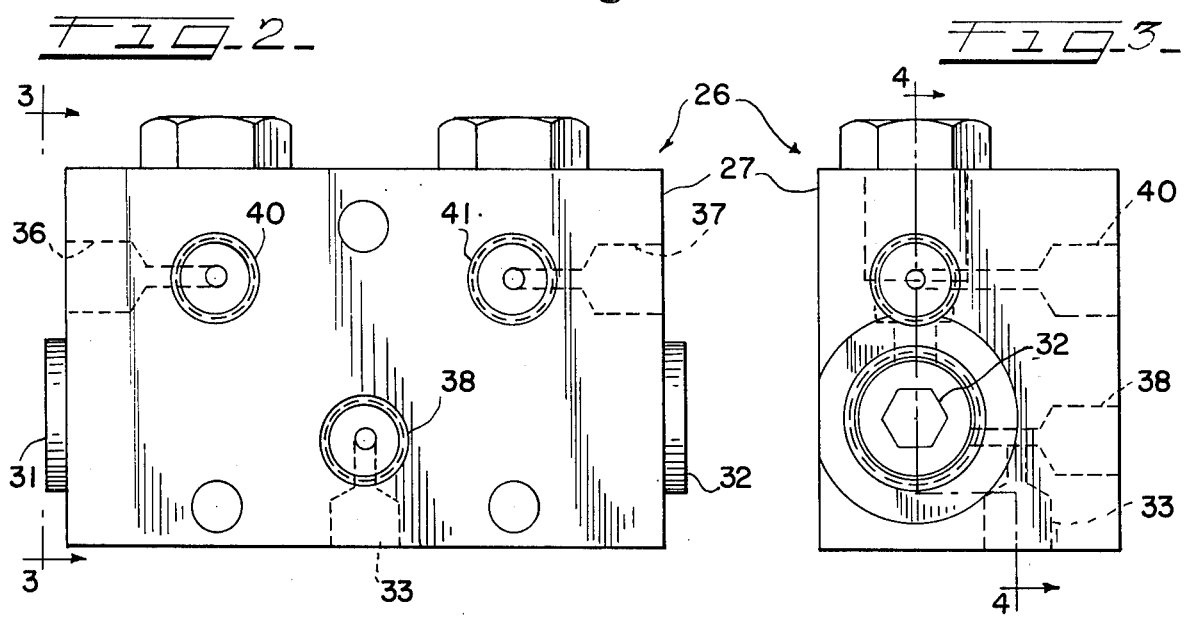
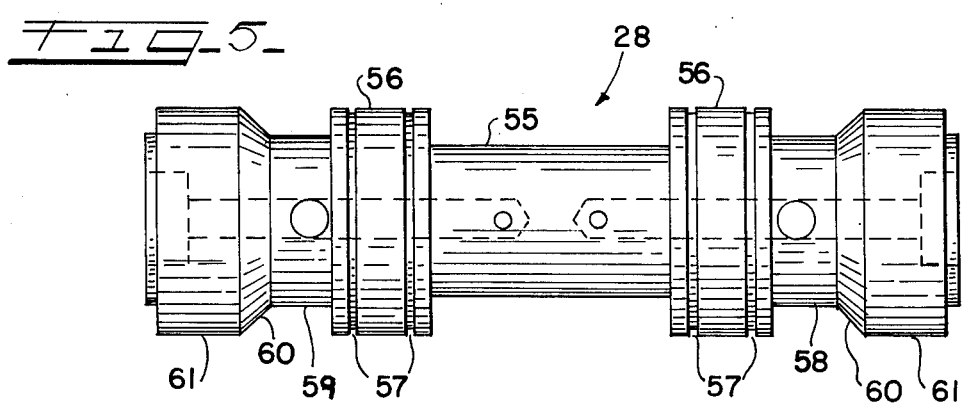

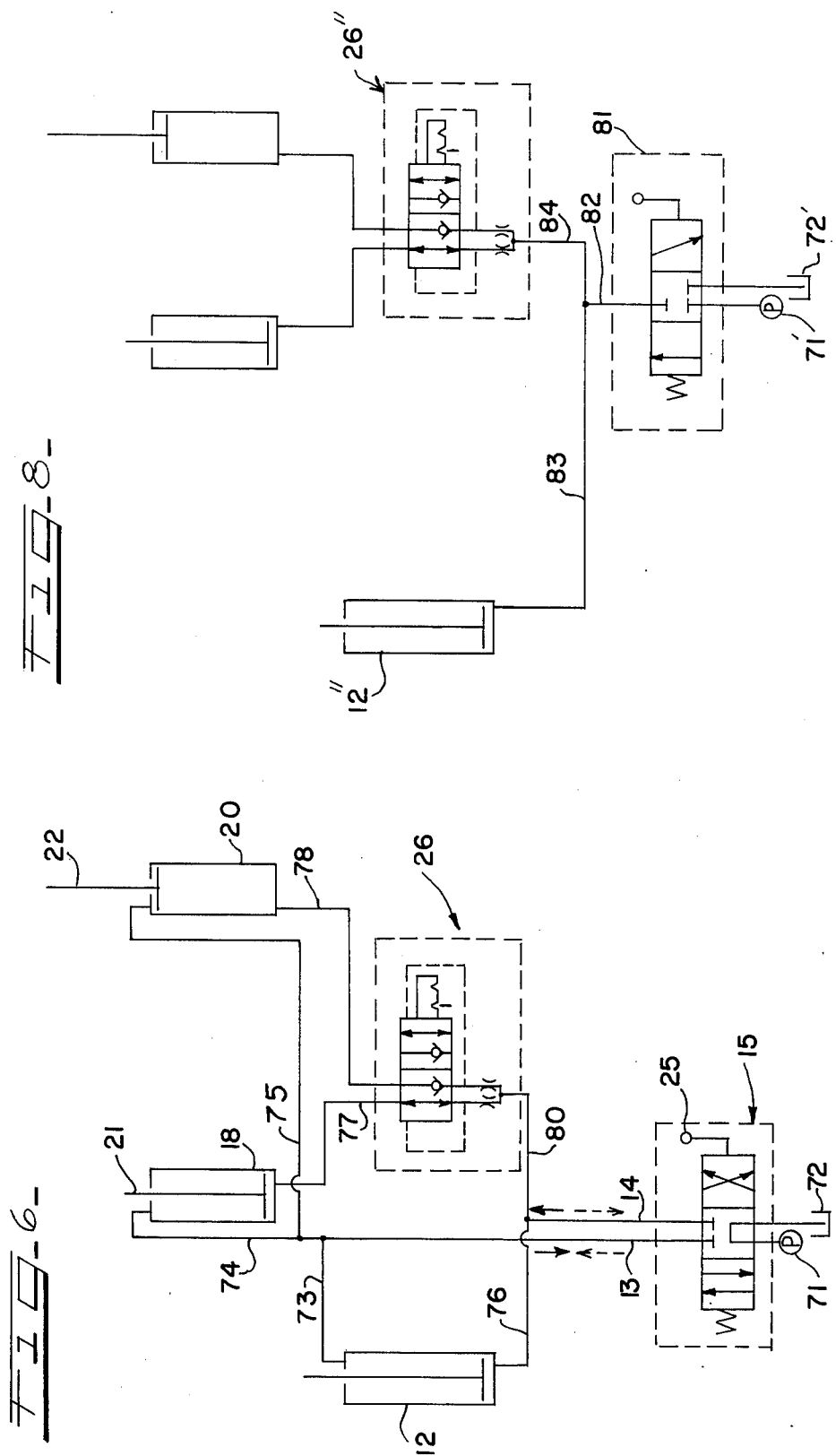

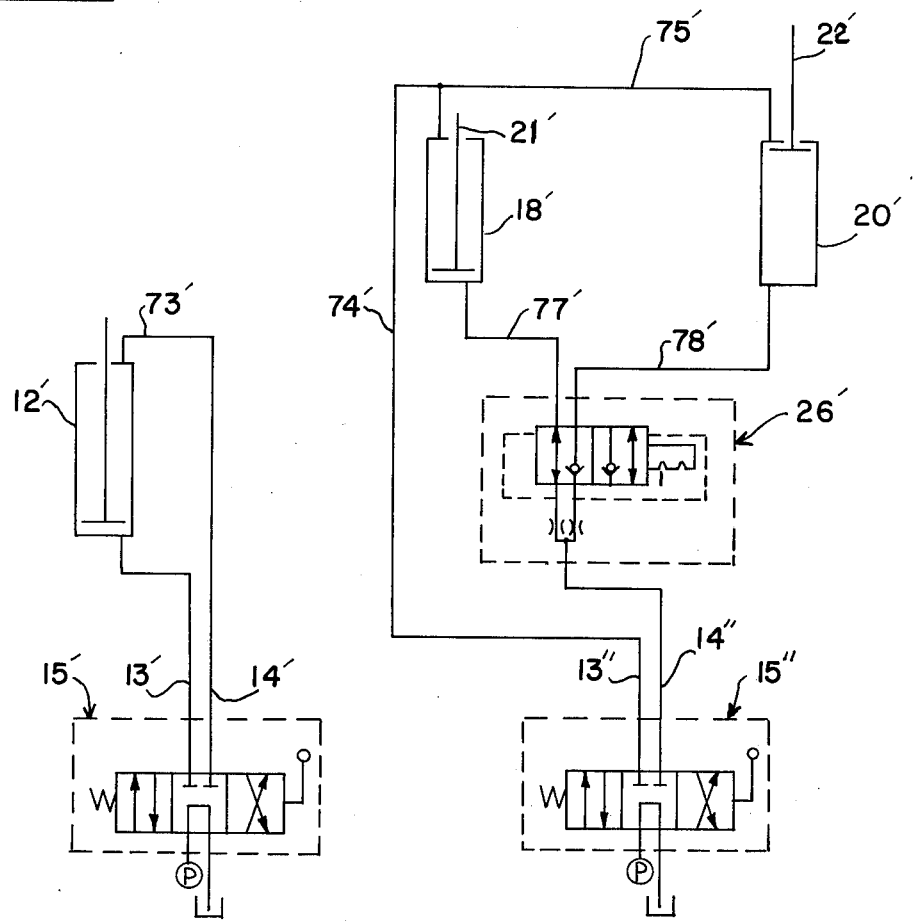

IMPLEMENT WITH AUTOMATIC SEQUENCING VALVE AND SYSTEM

The invention relates to innovations and improvements in hydraulic valve systems for operating the row markers with which multi-row implements, such as multi-row planters, are commonly equipped with. The invention also relates to innovations and improvements in automatic hydraulic sequencing valves used in such systems.

In the planting of large-acreage crops such, for example, as corn, soybeans, sugar beets, etc. it is common practice to utilize multi-row planters which are propelled by agricultural tractors having hydraulic systems for actuating the three-point hitches with which such tractors are commonly equipped and for operating other hydraulically actuatable equipment. The multi-row planters enable a tractor operator to efficiently plant many acres in a short period of time. Since, in the case of row crops it is important that all rows be parallel and equally spaced, and since the planted areas and rows do not assume a distinctly different appearance from the unplanted areas, it has been common practice to equip multi-row planters and other similar implements with markers hinged to the opposite sides with suitable means for alternately raising and lowering these markers as the operator reverses direction on reaching opposite ends of a field being planted. As is well understood, the mark left by the marker that is down during the traverse of a field serves to guide the tractor operator when he next traverses the field in the opposite direction.

Various arrangements have been provided for actuating the row markers in an automatic manner so that each time the tractor operator raises the implement on reaching one end of a traverse so as to make a 180° turn and then traverse in the opposite direction, the marker that has been down will automatically raise when the implement is raised and the marker that has previously been up will automatically lower when the implement is lowered.

Heretofore, some of the mechanisms employed for automatically actuating row markers mounted on opposite sides of implements such as multi-row planters have been of a completely mechanical nature as shown and described, for example, in Bauman et al U.S. Pat. No. 3,428,134 and Krumholz U.S. Pat. No. 3,454,103. Marker operating systems have also been heretofore provided wherein the row markers have been actuated by hydraulic cylinders associated therewith and controlled by a hydraulic sequencing valve having a shiftable spool suitably connected by a mechanical linkage so as to be automatically shifted as the implement is raised and/or lowered by the tractor operator.

In accordance with the present invention an implement row marker actuating system is provided wherein each of the markers hinged on the opposite sides or ends of an implement is actuated by an independent hydraulic cylinder and these cylinders are interconnected with the tractor hydraulic system with the hydraulic circuit incorporating an automatically operating sequence valve which is self-contained and wherein a spool automatically shifts to alternate positions during each time the implement is raised.

An important object of the invention is the provision of an improved automatically sequencing hydraulic valve capable of being advantageously used in performing various operations including the automatic actuation of hydraulic cylinders provided on agricultural implements such as multi-row planters which serve to alternately raise and lower row markers hinged to opposite sides of the implement.

Another important object of the invention is the provision of an improved system for automatically raising and lowering row markers on a multi-row implement such as a planter which system is completely hydraulic so as not to involve any mechanical linkage or exterior actuating parts.

Certain other objects of the invention will be obvious and will appear hereinafter. For a more complete understanding of the nature and scope of the invention reference may now be had to the following detailed description thereof taken in connection with the accompanying drawings wherein:

FIG. 1 is a front elevation of a multi-row planter of the type adapted to be drawn by a tractor and having a row marker control and actuating system forming one embodiment of the present invention;

FIG. 2 is a side elevational view of an automatic marker sequencing valve constructed and operable in accordance with the present invention;

FIG. 3 is an end elevational view of the automatic sequence valve taken on line 3—3 of FIG. 2;

FIG. 5 is an elevational view on enlarged scale of the spool for the valve of FIGS. 2-4;

FIG. 6 is a hydraulic circuit diagram of the hydraulic system for raising and lowering the multi-row planter and alternately raising and lowering the markers shown in FIGS. 1-5;

FIG. 7 is a hydraulic circuit constituting a modification of the hydraulic circuit shown in FIG. 6; and FIG. 8 is a hydraulic circuit diagram of a system forming another modification of the hydraulic system shown in FIG. 6.

Figure 4:
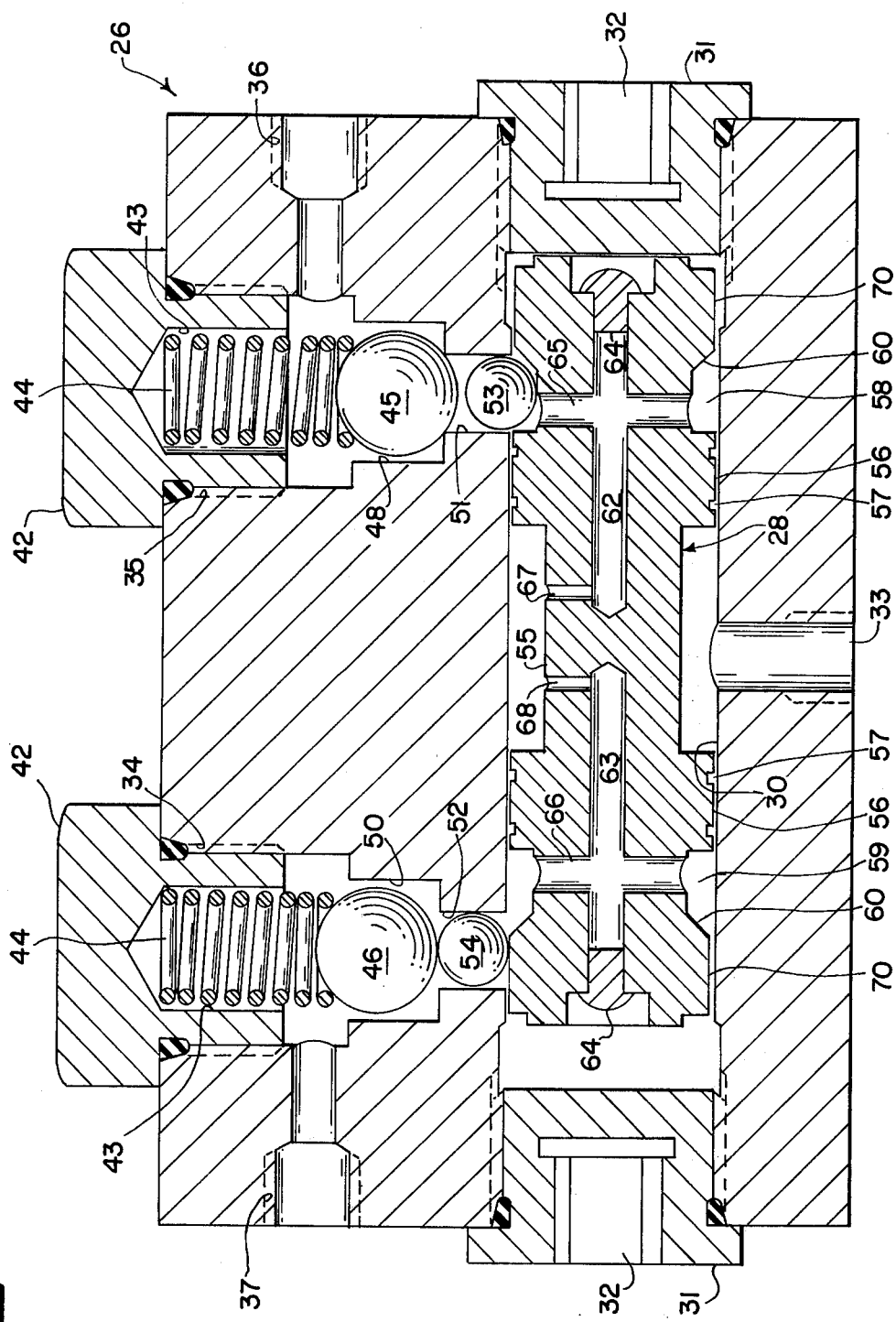
FIG. 4 is a vertical sectional view on enlarged scale taken on line 4—4 of FIG. 3.

Referring to FIG. 1, a multi-row planter of known type is indicated generally at 10. The planter 10 is supported on a plurality of ground wheels 11 which are arranged to be raised and lowered in synchronism in known manner by means of a double-acting hydraulic cylinder 12 (FIG. 6). The cylinder 12 is connected by hydraulic pressure hoses or lines 13 and 14 to an open-center, four-way, three-position valve 15 (FIG. 6) of the type conventionally used on modern agricultural tractors. However, either open-center or closed-center control valves can be used with either single or double-acting installations.

A pair of left and right hand row markers 16 and 17, respectively, are hingedly or pivotally mounted on opposite sides of the planter 10. The row markers 16 and 17 are arranged to be actuated (i.e. alternately raised and lowered) by means of a pair of double-acting hydraulic cylinders 18 and 20, respectively, mounted in suitable manner on the multi-row planter 10 and having the distal ends of their piston rods 21 and 22, respectively, pivotally connected to the markers as shown.

As will be readily understood by those familiar with the operation of tractor-drawn or mounted implements such as the multi-row planter 10, in traversing a field while planting the ground wheels 11 are at least partially retracted so as to lower the planter into a planting condition and at the same time one of the markers 16 or 17 will be lowered so that the disc carried on the outboard end thereof will make a suitable mark in the earth on the unplanted side of the strip being planted. When the operator reaches the end of a traverse, which normally occurs on arriving at one of the boundries of the field, he actuates the handle 25 (FIG. 6) on the tractor valve 15 so as to extend the planter lift cylinder 12 and also the wheels 11 thereby raising the planter out of planting engagement with the soil. The marker actuating system, as will be described below, is such that when the wheels 11 are extended (i.e. lowered) and the implement 10 thereupon raised, the marker that is down will also be raised. The operator then proceeds to make a 180° turn and then operates the handle 25 so as to allow the wheels 11 to retract (i.e. raise) thereby lowering the planter into planting engagement. On lowering the planter 10 the marker 16 or 17 that remained raised during the last previous traverse will now be lowered while the marker that has been raised last will remain raised. This sequence of operations continues as the operator proceeds to make a series of traverses of the field.

Reference may now be had particularly to FIGS. 2-5 for a description of the construction of the automatically actuable marker sequence valve 26 which constitutes a key component in the automatic marker actuating control system of the invention. The valve 26 comprises a valve body 27 which may be machined or cast from a suitable material, usually metal, and has housed therein a valve spool 28 formed of metal or other suitable material. The valve spool 28 is axially shiftable within a bore 30 (FIG. 4) extending end-to-end through the valve body 27 with the opposite ends of the bore 30 being tapped for receiving the threaded ends of the closure plugs 31—31 having socket wrench receiving recesses 32—32.

The valve block 27 is also suitably drilled and tapped to provide additional ports and interconnecting passages, including a bottom port 33, a pair of counterbored top ports 34 and 35, and a pair of counterbored end ports 36 and 37. In order to be able to make available connections to the valve body 27 from one face thereof instead of from the bottom and opposite ends, additional counterbored ports 38, 40 and 41 are provided (FIGS. 2 and 3) which communicate respectively with the ports 33, 36 and 37. It will be understood that when any of the ports 33, 36, 37, 38, 40 or 41 is not being utilized, the same will be closed by inserting thereinto a threaded plug.

Referring to FIG. 4, each of the counterbored top vertical ports 34 and 35 is tapped or threaded at the upper end so as to receive threaded plugs 42-42 each of which is provided with an axial socket or recess 43 opening to the bottom or inner end thereof for receiving and retaining therein the upper portion of a compression spring 44. The bottom end of each compression spring 44 bears against the upper portion of a check valve ball 45 or 46 retained within the intermediate couterbore sections 48 and 50, respectively. The bottom end of each counterbore section 51 and 52, respectively, opens into the horizontal passageway or opening 30 that receives the valve spool 28. The junctures between the smaller counterbore sections 51 and 52 and the intermediate counterbore sections 48 and 50, respectively, provide valve seats for the balls 45 and 46. A pair of smaller balls 53 and 54 are disposed in the passageways 51 and 52, respectively, for actuating or lifting the balls 45 and 46 upon the axial shifting of the spool 28 as will be described below. The smaller balls also serve as detents as will be mentioned below.

Referring to FIGS. 4 and 5 it will be noted that the valve spool 28 is symmetrical so that it does not make any difference as to which way it is inserted into the passageway 30. At its center portion the spool 28 is provided with a circumferential relatively wide groove 55 on the opposite sides of which are lands 56—56 each of which is provided with a pair of spaced circumferential balancing grooves 57—57. Outboard from the lands 56 are located circumferential grooves 58-59 the inner sides of which are vertical and the outer sides 60—60 of which are inclined or frusto-conical so as to provide camming surfaces for actuating the balls 53 and 54. Outboard of the grooves 58 are end lands or sections 61—61 of the spool 28. A pair of axial passageways 62 and 63 (FIG. 4) are drilled into the spool 28 from opposite ends. These passageways are counterbored at their outer ends so as to receive the heads of end plugs 64—64. Diametric passageways 65 and 66 are drilled in the spool 28 so as to intersect the axial passageways 62 and 63, respectively, and communicate with grooves 58 and 59, respectively. Relatively small diameter radial ports or passageways 67 and 68 are drilled into the spool 28 so as to communicate between the inner ends of the axial passageways 62 and 63, respectively, and the central circumference groove 55. The passageways 67, 68 are sized so as to throttle or restrict the flow rate of hydraulic fluid therethrough and thereby control the speed of actuation of the cylinders 18-20. The passageways 67, 68 by restricting the flow of fluid also determine the pressure differential between the ends of the valve spool 28, which causes it to shift axially in its bore 30 during the raising cycle of each marker.

The outer surface of each of the end lands 61 is provided with a small longitudinal groove 70 (FIG. 4) so as to provide a restrictive orifice in these lands permitting hydraulic fluid trapped in the adjacent end of the spool passageway 30 to exit in a controlled manner so that the axial movement of the spool 28 is slowed or restricted thereby preventing transient or momentary pressure surges from causing the valve spool 28 to shift prematurely. If desired, the end plugs 64—64 could be drilled with small openings to act as orifices in place of the grooves 70. However, the grooves 70 will have less tendency to become, or remain, plugged with foregin material and are therefore preferred.

Reference may now be had to FIGS. 4 and 6 for a description of the manner in which the valve 26 operates as a key component of the automatic marker control system on the implement 10. The tractor valve 15 has a port which is permanently connected with a pump indicated at 71 and another that is connected with a reservoir for hydraulic fluid indicated at 72. In addition, the tractor valve 15 has two ports with which the hydraulic lines 13 and 14 are connected which extend back to the implement 10. The valve 15 has three positions: a neutral position which is the position in which it is shown in FIG. 6; an implement-lowering position; and an implement-raising position. The lowering position is diagrammatically indicated at the left and when the valve 15 is shifted into the lowering position, (toward the right as viewed in FIG. 6) it will be seen that pressure flows from the pump 71 through the valve and out through the line 13 while fluid returns through line 14 and valve 15 into the sump 72. Alternately, it will be seen that when the valve 15 is shifted to the left into its raising position, then pressure from the pump 71 is communicated to the port that is connected with line 14 while the port to which line 13 is connected is placed in communication with the reservoir 72. The solid arrows adjacent the lines 13 and 14 in FIG. 6 indicate the flow of fluid through lines 13 and 14 during raising while the broken arrows indicate the directions of flow during lowering.

The hydraulic line 13 has connected thereto distributor lines 73, 74 and 75 which are connected to the planter lift cylinder 12, the left marker actuating cylinder 18, and the right marker actuating cylinder 20, respectively. The lines 73, 74 and 75 are connected to appropriate end ports on the cylinders 12, 18 and 20, respectively, so that when fluid under pressure is flowing through the lines or connections they serve to retract the pistons therein. The port at the opposite end of the cylinder 12 is connected by line 76 to the hydraulic line 14. The port at the opposite end of the cylinder 18 is connected by line 77 to port 37 of the valve 26 while the port at the opposite end of the cylinder 20 is connected by line 78 to the port 36 of the valve 26. The bottom port 33 of the valve 26 (and when desired the alternate side port 38) is connected by a line 80 to the hydraulic line 14.

With the tractor valve 15 in the neutral postion (its normal condition during traversing) it will be understood that there will be no flow of hydraulic fluid through either the tractor valve 15, the marker sequencing valve 26, or through any of the hydraulic lines or cylinders of the system. Since the ball check 45 is held in the seated condition as shown in FIG. 4 by both the force of spring 44 and the force or pressure due to the weight of the raised right hand marker 17 acting on the extended piston and in turn on the liquid in the cylinder 20, no flow past the ball check 45 is permitted and the right hand marker remains in the raised position.

When the tractor pulling the planter 10 reaches the end of the row or traverse, the operator will manipulate the handle 25 of the valve 15 so as to place the valve in its implement-raising position whereupon fluid under pressure discharges from the valve 15 through the line 14 from which it is distributed through the line 76 to the planter lift cylinder 12 and through the line 80 to the marker sequencing valve 26. The flowing hydraulic fluid serves to extend the piston and piston rod of the cylinder 12 so as to raise the planter 10 with fluid being discharged from the opposite side of the piston through line 73 and line 13 and through the valve 15 into the sump or reservoir 72. At the same time the fluid under pressure enters either the port 33 or 38 of the valve 26 (depending upon which is connected to line 80) the fluid flows through the restricted passageway 68, into the axial passageway 63, thence into the diametric passageway 66, upwardly past the balls 54 and 46, and out through the port 37 and line 77 to the left marker actuating cylinder 18. No fluid flow occurs through passageways 67, 62 and 65 because the right cylinder 20 (FIG. 6) is already at the limit or end of its stroke. The fluid enters the cylinder 18 and acts against the retracted piston therein so as to extend the piston and piston rod and thereby raise the left marker 16. During this extending of the piston rod, the fluid on the opposite side of the piston discharges through the line 74 and into the line 13.

Since the fluid under pressure can flow only through the restricted passageway 68, then under a reduced pressure through 63-66-52-50 to cylinder 18, and cannot flow through the alternate passageway 67, there is a differential in the pressure acting on the opposite ends of the spool 28 with that acting on the right hand end being greater than that acting on the left hand end. This differential in pressure is sensed by passageways 67, 62, 65, 58 and 70 in which a very minute amount of fluid is free to flow and produces a shifting of the spool 28 from the right to the left. However, shifting will be resisted in part by small size of the vent grooves 70 in the spool lands 61 and in part by the detent action of the ball 53 seated in the groove 58. The shifting of the spool 28 in one direction or the other begins at the start of each raise cycle and continues with the shift being completed early in the cycle while the raising of the marker that was down is continuing. It will be seen that when the spool 28 shifts to the left, the actuating ball 53 will ride up the inclined or camming surface 60 onto the adjacent end land 70 and thereby causes the ball check 45 to be unseated. However, since the right hand marker actuating cylinder 20 is already extended, there will be no flow of fluid past the ball check 45 and through the line 78. With the shift of the spool 28 to the left being completed, the groove 59 will be in registration with the actuating ball 54 which is free to fall into this groove 59 thereby allowing the ball check 46 to be seated as soon as the actuating cylinder 18 is fully extended so that the left hand marker is fully raised and no further flow of fluid is permitted through the line 77. When the operator has completed his turn with both of the markers now being in their raised position, he will actuate the operating handle 25 so as to place the tractor valve 15 in its implement-lowering position. Fluid under pressure will now flow through line 13 and in turn through the branch connections 73, 74 and 75. At the same time the line 14 is connected with the reservoir 72 through the valve 15 and thereby allows fluid to flow through and discharge through lines 76 and 80 into line 14 and then into the reservoir. In this manner the implement planter cylinder 12 will be returned to its retracted or lowered position. Fluid will also be allowed to discharge from the right hand marker cylinder 20 through line 78 and past the unseated ball check 45 and then via passageways 65, 62 and 67 to the discharge port 33 or 37 thence through the lines 80 and 14 to the reservoir 72. Since the ball check 46 for the left hand marker cylinder will be in the seated condition, no fluid will be allowed to discharge past this ball check and the left hand marker will remain in the raised position. When the implement is fully lowered the operator places the operating handle 25 of the valve 15 in the neutral position and the system remains static during traverse of the field.

It will be understood that when the operator reaches the end of the traverse being made with the right hand marker down and the left hand marker raised, he will again manipulate the valve 15 so as to place it in the implement-raising condition. Thereupon the foregoing sequence of operations or cycle will reoccur but in the alternate order with the valve spool 28 being shifted to the right so that the right hand cylinder which is being raised will remain raised while the left hand marker will be allowed to lower when the operator next lowers the implement 10.

If it is desired to have a system wherein the implement can be operated, i.e. raised and lowered independently and the markers can likewise be operated independently, this can be accomplished by providing two valves on the tractor as indicated at 15' and 15" in FIG. 7. It will be seen from the diagram in FIG. 7 that the sequencing valve 26' will operate in the same manner as previously to alternately raise and lower the left and right hand markers when the tractor valve 15" is manipulated so as to place it alternately in marker-raising position and marker-lowering position while intermittently occupying the neutral condition. The system of FIG. 7 has the advantage of flexibility from the standpoint of the operator since he can raise, lower or leave raised one or both markers independently of the position or condition of the implement. For example, the operator may not want to lower either of the markers in the event there is not adequate clearance on either side or if it is necessary for the markers to be raised in order to clear obstacles such as trees, ditches, etc. On the other hand, the system of FIG. 7 has the disadvantage of requiring the operator to manipulate two tractor valves 15' and 15" instead of a single valve.

FIG. 8 illustrates diagrammatically a system wherein the automatic marker sequencing valve 26" is utilized with a planter lift cylinder and marker actuating cylinders of the single acting type. That is, hydraulic fluid for actuating these cylinders is introduced and discharged through the same port. The force of the hydraulic fluid is utilized for extending these cylinders and they depend upon the weight of the implement and markers respectively and/or spring action or other known spring-like energy storing means for retracting the cylinders during lowering. Referring to FIG. 8 it will be seen that the tractor valve 81 is of the type that in one position fluid is transmitted by the valve from a pump or pressure source 71' through a line 82 which connects with a line 83 going to the planter lift cylinder 12" and through line 84 to the sequencing valve 26". When the valve 81 is in the implement lowering position, then line 82 is placed in communication with the sump or reservoir 72'. It will be seen that the sequencing valve 26" operates in the same way as described above in connection with FIG. 6 to alternately raise and lower the left and right hand markers 16 and 17.

What is claimed as new is:

1. In combination with an implement adapted to be propelled by a tractor having a hydraulic system including hydraulic control valve means, said implement having operatively mounted thereon a pair of first and second members adapted to be alternately operated by a pair of first and second member-actuating hydraulic cylinders mounted on said implement and operatively connected with said first and second members, respectively, for actuating the same, an automatic hydraulically actuated and hydraulically controlled member-control sequencing valve having a valve spool shiftable by differential hydraulic pressures acting thereon and created by the flow of hydraulic fluid through restricted passageways within said valve including restricted passageways through said valve spool, said valve being connected in hydraulic circuit relationship with said first and second member-actuating hydraulic cylinders and adapted to also be connected in hydraulic circuit relationship with said tractor hydraulic control valve means for receiving hydraulic fluid under pressure from said tractor hydraulic system and automatically operable each time hydraulic fluid is delivered thereto after delivery has been interrupted to shift said valve spool and actuate the one of said first and second member-actuating cylinders not actuated immediately preceding.

2. The combination called for in claim 1 wherein said pair of first and second members are ground markers.

3. The combination called for in claim 1 wherein said implement is a planter and said pair of first and second members are ground markers.

4. The combination called for in claim 1 wherein said automatic hydraulically actuatable member-control sequencing valve contains an axially shiftable valve spool which alternately shifts between two positions.

5. In combination with an implement shiftable between raised and lowered conditions and adapted to be propelled by a tractor having a hydraulic system including hydraulic control valve means, said implement having (1) an implement-actuating hydraulic cylinder for alternating shifting said implement from one of said conditions to the other, (2) a pair of left and right hand markers operable between extended and retracted positions, and (3) a pair of left and right hand marker-actuating hydraulic cylinders mounted on said implement and operatively connected with left and right hand markers, respectively, an automatic hydraulically actuated and hydraulically controlled marker-control sequencing valve having a valve spool shiftable by differential hydraulic pressures acting thereon and created by the flow of hydraulic fluid through restricted passageways within said valve including restricted passageways through said valve spool, said valve being connected in hydraulic circuit relationship with said left and right hand marker-actuating cylinders and also adapted to be connected in hydraulic circuit relationship with said left and right hand marker-actuating cylinders and also adapted to be connected in hydraulic circuit relationship with said tractor hydraulic means whereby hydraulic fluid under relatively high pressure is delivered to said sequencing valve each time said implement is raised and said valve spool automatically shifts from one of its two alternate positions to the other position each time said implement is raised whereby one of said markers which is down is raised when said implement is raised and the other of said markers which was up when said marker is raised is lowered when said implement is lowered.

* * * * *